(12) United States Patent
Neuwald et al.

(10) Patent No.: US 8,051,144 B2
(45) Date of Patent: Nov. 1, 2011

(54) J2EE ENTERPRISE INFORMATION SYSTEM (EIS) COMMON OBJECT REQUEST BROKER ARCHITECTURE (CORBA) CONNECTOR

(75) Inventors: Peter Robert Neuwald, Milwaukee, WI (US); William R. Trost, Mequon, WI (US); Scott Ryan Watry, New Berlin, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2825 days.

(21) Appl. No.: 10/628,254

(22) Filed: Jul. 29, 2003

(65) Prior Publication Data

US 2005/0028164 A1 Feb. 3, 2005

(51) Int. Cl.
*G06F 15/16* (2006.01)
(52) U.S. Cl. ........................................ 709/219
(58) Field of Classification Search ............... 709/227, 709/219, 226
See application file for complete search history.

(56) References Cited

U.S. PATENT DOCUMENTS

| | | | |
|---|---|---|---|
| 6,484,214 B1 * | 11/2002 | Sundermier | 719/332 |
| 6,484,310 B1 | 11/2002 | Przybylski et al. | |
| 6,519,643 B1 * | 2/2003 | Foulkes et al. | 709/227 |
| 6,539,383 B2 | 3/2003 | Charlet | |
| 6,980,515 B1 * | 12/2005 | Schunk et al. | 709/229 |
| 2002/0032783 A1 | 3/2002 | Tuatini | |
| 2002/0046240 A1 * | 4/2002 | Graham et al. | 709/203 |
| 2003/0023577 A1 | 1/2003 | Sundius et al. | |
| 2003/0056028 A1 | 3/2003 | Underwood et al. | |
| 2003/0065827 A1 | 4/2003 | Skufca et al. | |
| 2003/0084056 A1 * | 5/2003 | DeAnna et al. | 707/100 |
| 2003/0093402 A1 | 5/2003 | Upton | |
| 2003/0105887 A1 | 6/2003 | Cox et al. | |
| 2004/0039800 A1 * | 2/2004 | Black et al. | 709/220 |

OTHER PUBLICATIONS

"Java™ 2 Platform Enterprise Edition Specification, v1.3" by Bill Shannon et al., released Jul. 27, 2001.
"Java™ Enterprise Edition: J2EE™ Connector Architecture Specification v.1.0", by Rahul Sharma et al., released Aug. 22, 2001.
A printout of a Web site relating to "CORBA BASICS", 5 pages, available to Applicants' representatives no later than Sep. 12, 2003.
A printout of a Web site relating to "J2EE Connector Architecture", 5 pages, available to Applicants' representatives no later than Sep. 12, 2003.

* cited by examiner

*Primary Examiner* — Benjamin R Bruckart
(74) *Attorney, Agent, or Firm* — Greenblum & Bernstein, P.L.C.

(57) ABSTRACT

Connections between a Java 2 enterprise edition (J2EE) application server and a common object request broker architecture (CORBA) enterprise information system are managed. A resource adapter is integrated with the application server. The resource adapter includes an encapsulated CORBA interface to the enterprise information system. Additionally, a persistent CORBA connection is established between the application server and the enterprise information system.

25 Claims, 4 Drawing Sheets

J2EE ENTERPRISE INFORMATION SYSTEM (EIS) COMMON OBJECT REQUEST BROKER ARCHITECTURE (CORBA) CONNECTOR

BACKGROUND OF THE INVENTION

1. Field of the Invention

The present invention relates to a Java 2 enterprise edition—common object request broker architecture connector. More particularly, the present invention relates to a connector for managing common object request broker architecture connections from a Java 2 enterprise edition compliant application server to an enterprise information system.

2. Background Information

A client connected to an application server program through a computer network may request the services of an enterprise information system (EIS). For example, a client may be connected to a web application server program through the internet. The web application server program may enable the client to request the services of an external enterprise information system that provides the information infrastructure for an enterprise to clients of the enterprise. For example, an enterprise information system may offer a set of information services to clients of an enterprise.

Common object request broker architecture (CORBA) defines interfaces for each individual unit of running software that combines functionality and data, i.e., for each object. A client that wants to invoke an operation on an object must use the defined interface to specify the operation it wants to perform. For example, a service manager in a telecommunications environment may process only CORBA requests from a client to access and change service information.

Currently, vendor-specific architectures are used to integrate application servers and enterprise information systems. The Java 2 enterprise edition (J2EE) specification is being developed to define a standard architecture for integrating application servers and enterprise information systems. Nevertheless, even if J2EE is widely adopted, a legacy enterprise information system such as a telecommunications service manager may still process only CORBA requests from an application server program. If an application server program operates according to the J2EE architecture that is being developed, a J2EE—CORBA connector will be required to establish and maintain CORBA connections with an enterprise information system. For example, a J2EE—CORBA connector will be required to enable a J2EE compliant application server program to convey client requests to the legacy service manager.

Accordingly, a J2EE—CORBA connector is required to integrate a J2EE compliant application server and a enterprise information system that uses CORBA. A customizable deployment descriptor is also required to customize the deployment and management of each CORBA connection. Moreover, a method of integrating the J2EE—CORBA connector with the application server is required.

To fulfill the needs set forth above, a J2EE enterprise information system (EIS) common object request broker architecture (CORBA) connector is provided.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
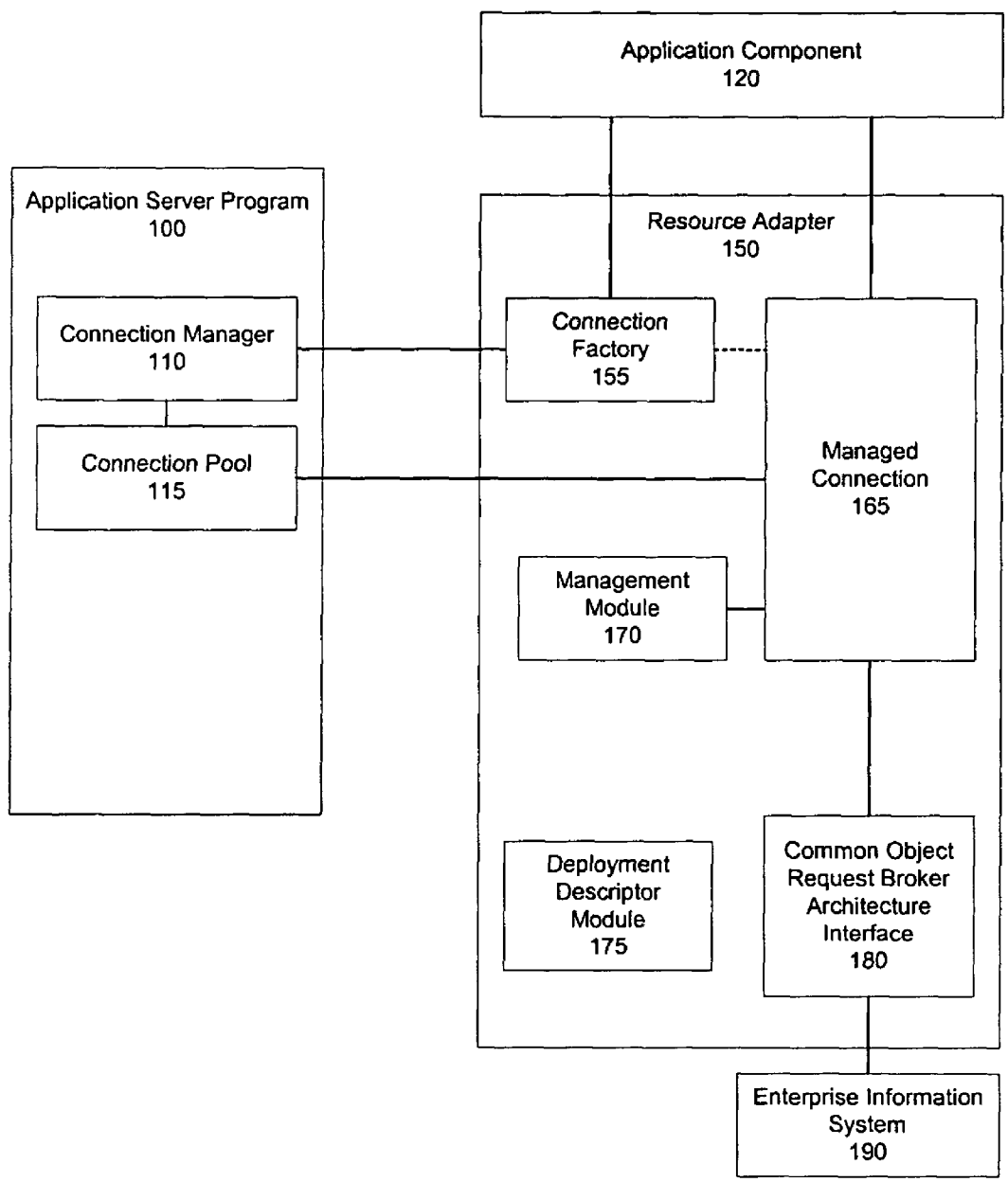
FIG. 1 shows exemplary software architecture for integrating a resource adapter with an application server, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, connections between a J2EE application server and a CORBA enterprise information system are managed. A resource adapter is integrated with the application server. The resource adapter includes an encapsulated CORBA interface to the enterprise information system. A persistent CORBA connection is established between the application server and the enterprise information system.

According to another aspect of the present invention, a request is received from an application component implemented by the application server. The application component requests the allocation of the persistent CORBA connection. A determination is made whether the persistent CORBA connection is available for allocation.

According to still another aspect of the present invention, the persistent CORBA connection to the application component is allocated when a persistent CORBA connection is available. The application component is informed that the CORBA connection is unavailable when the persistent CORBA connection is unavailable.

According to yet another aspect of the present invention, another persistent CORBA connection is established between the application server and the enterprise information system when the persistent CORBA connection is unavailable. The other persistent CORBA connection is allocated to the application component.

According to another aspect of the present invention, a message is received from the enterprise information system. The message indicates that the persistent CORBA connection is not active. In response to the message the persistent CORBA connection is terminated.

According to still another aspect of the present invention, the persistent CORBA connection is monitored to determine whether the persistent CORBA connection is active.

According to yet another aspect of the present invention, additional CORBA connections are established between the application server and the enterprise information system until a predetermined minimum number of CORBA connections are established. Additional CORBA connections are established between the application server and the enterprise information system until a predetermined maximum number of CORBA connections are established. After the predetermined minimum number of CORBA connections are established, a CORBA connection is established based on a determination that the previously established CORBA connections are unavailable. The determination is made in response to a request from an application server to allocate a CORBA connection.

According to an aspect of the present invention, connections between a J2EE application server and a CORBA enterprise information system are managed using a computer program stored on a computer readable medium. The computer readable medium includes an integrating source code segment that integrates a resource adapter with the application server. The resource adapter includes an encapsulated CORBA interface to the enterprise information system. The computer readable medium also includes a persistent CORBA connection establishing source code segment that establishes a persistent CORBA connection between the application server and the enterprise information system.

According to another aspect of the present invention, the computer readable medium also includes a request receiving source code segment that receives a request from an application component implemented by the application server. The application component requests the allocation of a persistent CORBA connection. The computer readable medium also includes an availability determining source code segment that determines whether the persistent CORBA connection is available for allocation.

According to still another aspect of the present invention, the computer readable medium includes a CORBA connection allocating source code segment that allocates the persistent CORBA connection to the application component when a persistent CORBA connection is available. The computer readable medium also includes a connection manager informing source code segment that informs the application component that the CORBA connection is unavailable when the persistent CORBA connection is unavailable.

According to yet another aspect of the present invention, the computer readable medium includes another persistent CORBA connection establishing source code segment. The another persistent CORBA connection establishing source code segment establishes another persistent CORBA connection between the application server and the enterprise information system when the persistent CORBA connection is unavailable. The computer readable medium also includes another CORBA connection allocating source code segment that allocates the other persistent CORBA connection to the application component.

According to another aspect of the present invention, the computer readable medium includes a message receiving source code segment that receives a message from the enterprise information system. The message indicates that the persistent CORBA connection is not active. The computer readable medium also includes a persistent CORBA connection terminating source code segment that terminates the persistent CORBA connection in response to receiving the message that the persistent CORBA connection is not active.

According to still another aspect of the present invention, the computer readable medium includes a monitoring source code segment that monitors the persistent CORBA connection to determine whether the persistent CORBA connection is active.

According to yet another aspect of the present invention, the computer readable medium includes a minimum CORBA connections establishing source code segment that establishes additional CORBA connections between the application server and the enterprise information system until a predetermined minimum number of CORBA connections are established. The computer readable medium also includes a maximum CORBA connections establishing source code segment that establishes additional CORBA connections between the application server and the enterprise information system until a predetermined maximum number of CORBA connections are established. A CORBA connection established after the predetermined minimum number of CORBA connections are established, is established based on a determination that the previously established CORBA connections are unavailable. The determination is made in response to a request from an application server for the allocation of a CORBA connection.

According to an aspect of the present invention, a J2EE compliant application server hosts a resource adapter for managing connections between the application server and a CORBA enterprise information system. The application server includes a processor that implements a customized deployment descriptor for deploying the resource adapter. The resource adapter includes an encapsulated CORBA interface for the enterprise information system. The resource adapter establishes a persistent CORBA connection between the application server and the enterprise information system.

According to still another aspect of the present invention, the application server includes a connection manager that processes a request to allocate the persistent CORBA connection. The request is received from an application component implemented by the application server. The application server determines whether the persistent CORBA connection is available for allocation in response to receiving the request.

According to yet another aspect of the present invention, the connection manager allocates the persistent CORBA connection to the application component when the persistent CORBA connection is available. The connection manager determines that the CORBA connection is unavailable when the persistent CORBA connection is unavailable.

According to another aspect of the present invention, another persistent CORBA connection is established with the enterprise information system when the persistent CORBA connection is unavailable. The connection manager allocates the other persistent CORBA connection to the application component.

According to still another aspect of the present invention, the application server includes a connection manager that receives a message from the enterprise information system indicating that the persistent CORBA connection is not active. The connection manager terminates the persistent CORBA connection in response to receiving the message.

According to yet another aspect of the present invention, the application server includes a connection manager that monitors the persistent CORBA connection to determine whether the persistent CORBA connection is active.

According to another aspect of the present invention, the application server includes a management module that establishes additional CORBA connections with the enterprise information system until a predetermined minimum number of CORBA connections are established. The management module establishing additional CORBA connections with the enterprise information system until a predetermined maximum number of CORBA connections are established. The application server includes a connection manager that receives requests from an application component implemented by the application server to allocate a CORBA connection. The management module establishes CORBA connections after the predetermined minimum number of CORBA connections are established. The CORBA connections established after the predetermined minimum number are established based on a determination that the previously established CORBA connections are unavailable.

A user uses a client device to contact a web application server over the internet. Exemplary client devices include a personal digital assistant (PDA), a personal computer (PC), a laptop computer, or any other type of device that permits access to the internet. Exemplary web application servers include IBM WebSphere or BEA Systems WebLogic.

The web application server is J2EE compliant and implements application components that interact with the user. A detailed description of the various features of J2EE may be found in "Java™ 2 Platform Enterprise Edition Specification, v1.3", in the names of Bill SHANNON et al., released Jul. 27, 2001, the disclosure of which is expressly incorporated herein by reference in its entirety.

An application component implemented by the web application server may process requests from the user. The application component provides a user interface to the user. The user interface enables the user to connect, directly or indirectly, with a CORBA enterprise information system (EIS). The CORBA enterprise information system processes requests that include, for example, CORBA application programming interfaces (APIs) that are used to process objects.

A J2EE compliant connector is provided as a resource adapter to connect the J2EE compliant web application server and the CORBA enterprise information system. A detailed description of the various features of a J2EE connector may be found in "Java™ Enterprise Edition: J2EE™ Connector Architecture Specification v.1.0", in the names of Rahul SHARMA et al., released Aug. 22, 2001, the disclosure of which is expressly incorporated herein by reference in its entirety. The resource adapter defines a set of scalable, secure and transactional mechanisms to enable the integration of the CORBA enterprise information system with the J2EE compliant web application server.

The resource adapter encapsulates a CORBA interface for the CORBA enterprise information system. The CORBA interface for the CORBA enterprise information system specifies the CORBA application programming interfaces used by the CORBA enterprise information system.

The resource adapter is plugged into the J2EE compliant web application server and enables communication between the J2EE compliant web application server and the CORBA enterprise information system. The resource adapter is standardized for the CORBA enterprise information system so that it can be plugged into any J2EE compliant application server to establish connections with the CORBA enterprise information system.

Accordingly, the user using the internet-enabled client device can obtain the user interface from an application component implemented by the J2EE compliant web application server. The resource adapter enables the application component to connect with the CORBA enterprise information system. The user interface is used to forward CORBA requests from the user to a CORBA enterprise information system. The resource adapter is provided to ensure that the J2EE compliant web application server can forward CORBA requests that can be processed by the CORBA enterprise information system.

Figure 4:
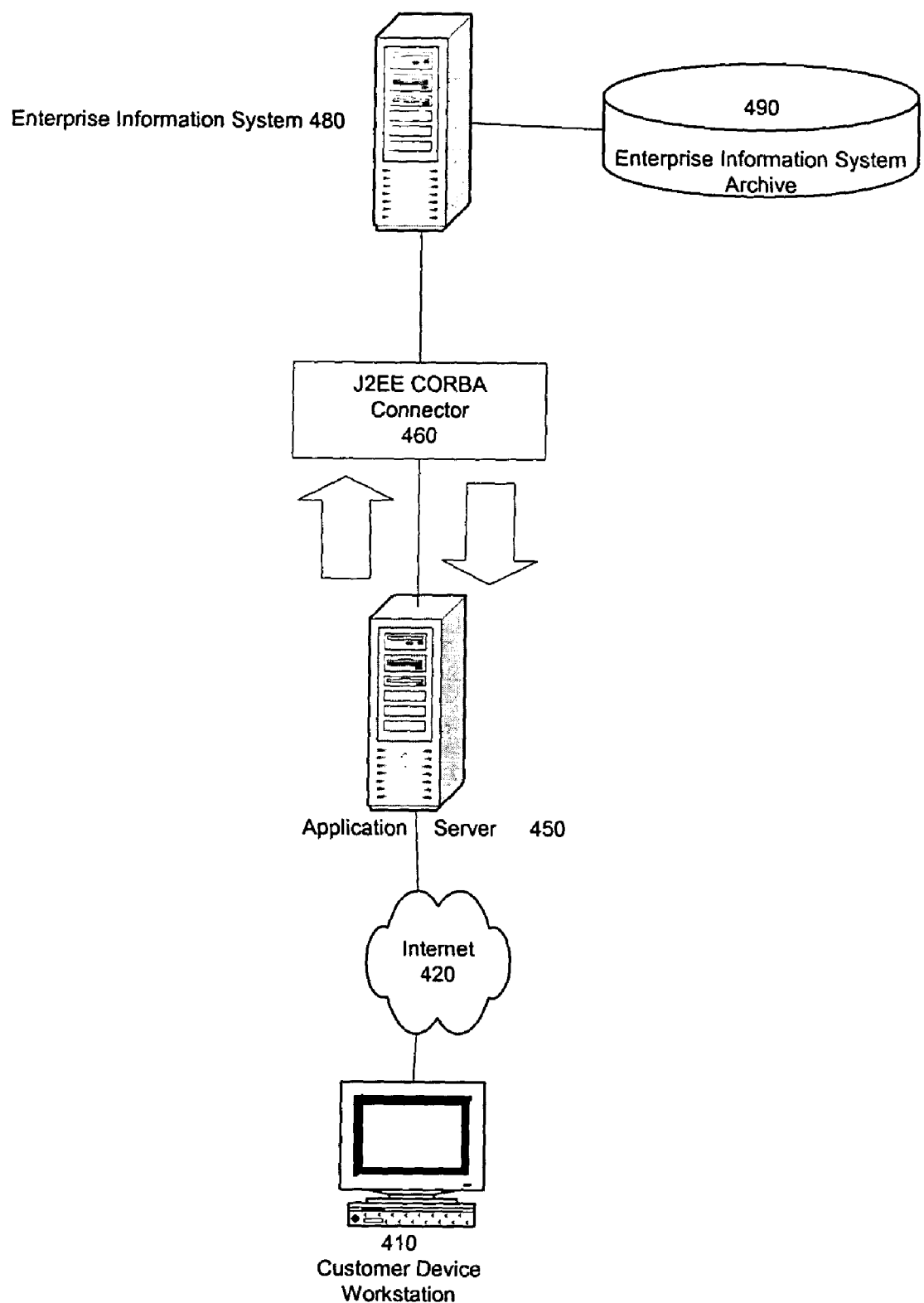
FIG. 4 is exemplary architecture of a network integrating an enterprise information system with an application server, according to an aspect of the present invention.

FIG. 4 shows an architecture of a network integrating a CORBA enterprise information system 480 with an J2EE compliant application server 450. In the embodiment of FIG. 4, a customer device workstation 410 communicates with the J2EE compliant application server 450 over the internet 420. The customer device 410 may be, e.g., any internet enabled device. Additionally, the J2EE compliant application server 450 may be, e.g., a web application server. The application server 450 hosts a J2EE CORBA connector 460. The CORBA enterprise information system 480 is connected to the application server 450 through the J2EE CORBA connector 460. The J2EE CORBA connector 460 enables the application server 450 to forward CORBA requests to the CORBA enterprise information system 480 over managed CORBA connections. The CORBA enterprise information system 480 manages one or more enterprise information archives 490 that store information for an enterprise.

The CORBA enterprise information system 480 receives a CORBA request from the application server 450. The CORBA request uses one or more CORBA application programming interfaces to specify operations to perform on an object managed by the CORBA enterprise information system 480. The specified operations may include, e.g., accessing, deleting, retrieving or moving account information. Of course, the specified operations may be any operation enabled by the provider of the CORBA enterprise information system 480.

In an embodiment, the CORBA enterprise information system 480 is a CORBA service manager in a telecommunications system and the enterprise information system archive 490 is a service control point database in the telecommunications system. A CORBA service manager is, for example, a Lucent enhanced Service Manager (eSM) that manages one or more service control points in the telecommunications system. A service control point database stores service account information for customers of a telecommunications service provider. In the telecommunications system embodiment, the user of the customer device workstation 410 is a customer of the telecommunications service provider. The customer uses a service independent platform implemented by the application server 450 to access and change service account information over the internet 420.

Accordingly, using the J2EE CORBA connector 460, a legacy CORBA enterprise information system 480 that processes CORBA requests will allow J2EE compliant application servers 450 to forward CORBA requests from a user of a customer device workstation 410. Of course, the present invention is not limited to service managers in a telecommunications environment. Rather, the present invention enables any CORBA enterprise information system to process CORBA requests from J2EE application servers, using a J2EE—CORBA connector.

FIG. 1 shows exemplary software architecture for integrating a resource adapter with an application server. As shown, an application server program 100, an application component 120 and a resource adapter 150 are provided. The application server program 100 provides deployment, management and execution support for J2EE compliant application components 120. Although not shown in FIG. 1, the application server program 100 is implemented on a J2EE compliant application server 450 that provides support for component based enterprise applications. The application server program 100 deploys and manages application components 120.

The application server program 100 includes a connection manager 110 that manages unused managed CORBA connections 165 for the application server program 100. The unused managed CORBA connections 165 are pooled in a connection pool 115. For example, when a user using the application component 120 requests the services of an external CORBA enterprise information system 190, the connection manager 110 determines whether an appropriate managed CORBA connection 165 to the CORBA enterprise information system 190 is available in the connection pool 115.

A resource adapter 150 is provided as a J2EE—CORBA connector to the CORBA enterprise information system 190. The resource adapter 150 is plugged into the J2EE compliant application server 450 that hosts the application server program 100. As shown, the resource adapter 150 encapsulates a CORBA interface 180. The encapsulated CORBA interface 180 enables the application component 120 to forward CORBA requests to the CORBA enterprise information system 190 via the managed CORBA connection 165.

The managed CORBA connection 165 uses the CORBA interface 180 to ensure that requests to the enterprise information system 190 are compatible with application programming interfaces (APIs) of the enterprise information system 190. The requests from the encapsulated CORBA interface 180 specify operations for the enterprise information system 190 to perform on objects.

The resource adapter 150 manages the CORBA connections between the application component 120 and the CORBA enterprise information system 190. The resource adapter 150 is customized for the CORBA enterprise information system 190.

Additionally, a deployment descriptor module 175 is provisioned to specify parameters for the deployment of each connection 165. The deployment descriptor module 175 may specify which application components 120 implemented by the application server 450 are entitled to communicate over a managed connection 165 to the CORBA enterprise information system 190. Since the application server program 100 may implement multiple application components 120, the deployment descriptor module 175 may specify the minimum and maximum number of managed CORBA connections 165 to be established for each application component 120. Accordingly, each managed CORBA connection 165 can be customized according to the needs of the J2EE compliant application server 450. For example, a minimum number and a maximum number of managed CORBA connections may be established and managed by the resource adapter 150.

In an embodiment, the management module 170 initiates new managed CORBA connections 165 when the number of available managed CORBA connections 165 falls below a threshold. In another embodiment, the connection manager 110 maintains a minimum number of managed CORBA connections 165 and a maximum number of managed CORBA connections 165, based upon parameters stored by the deployment descriptor module 175. The management module 170 only exceeds the minimum number of managed CORBA connections 165 on an as-needed basis. In an embodiment, if a connection request from an application component 120 cannot be satisfied, the management module 170 informs the connection manager 110 that a managed connection 165 can not be established, and the connection manager 110 informs the application component 120 that a managed connection 165 is unavailable via the connection factory 155.

The managed CORBA connections 165 are persistent such that they are maintained even when a particular application component 120 session ends. Accordingly, a managed CORBA connection 165 may be used for requests from more than one application component 120, though the connection may be lost or disconnected, e.g., after a period of inactivity.

The resource adapter 150 also includes a connection factory 155. When the application component 120 needs a managed CORBA connection 165 to the enterprise information system 190, the application component 120 requests the managed CORBA connection 165 from the connection factory 155. In turn, the connection factory 155 delegates the connection request to the connection manager 110 of the application server program 100. The connection manager 110 determines whether a matching managed CORBA connection 165 is available in a connection pool 115 provided by the J2EE application server. If a matching managed CORBA connection 165 is available in the connection pool 115, then the matching managed CORBA connection 165 is allocated to the application component 120.

Each managed CORBA connection 165 has an application-level handle to reference the underlying physical connection. The application component 120 contacts the connection factory 155 to obtain the handle of a managed connection 165. The application component 120 may contact the connection factory 155 to obtain multiple managed connections 165 using a, e.g., getConnection, method call. As described above, the connection manager 110 determines whether an appropriate managed CORBA connection 165 is available from the connection pool 115. If an appropriate managed CORBA connection 165 is not available, the management module 170 establishes an appropriate managed CORBA connection 165, so long as a new appropriate connection 165 can be established according to the deployment descriptor 175. The handle of the new connection 165 is passed to the application component 120 via the connection factory 155.

Once the managed CORBA connection 165 is established between the CORBA application component 120 and the CORBA enterprise information system 190, the CORBA requests are forwarded to the CORBA enterprise information system 190. The CORBA requests specify operations to perform on an object managed by the service manager. Accordingly, the resource adapter 150 enables the customer to specify operations for the CORBA enterprise information system 190 to perform, though the customer is accessing a J2EE compliant web component. Additionally, the resource adapter 150 establishes, maintains and manages one or more managed CORBA connections 165 to the enterprise information system 190 through the CORBA interface 180.

Figure 2:
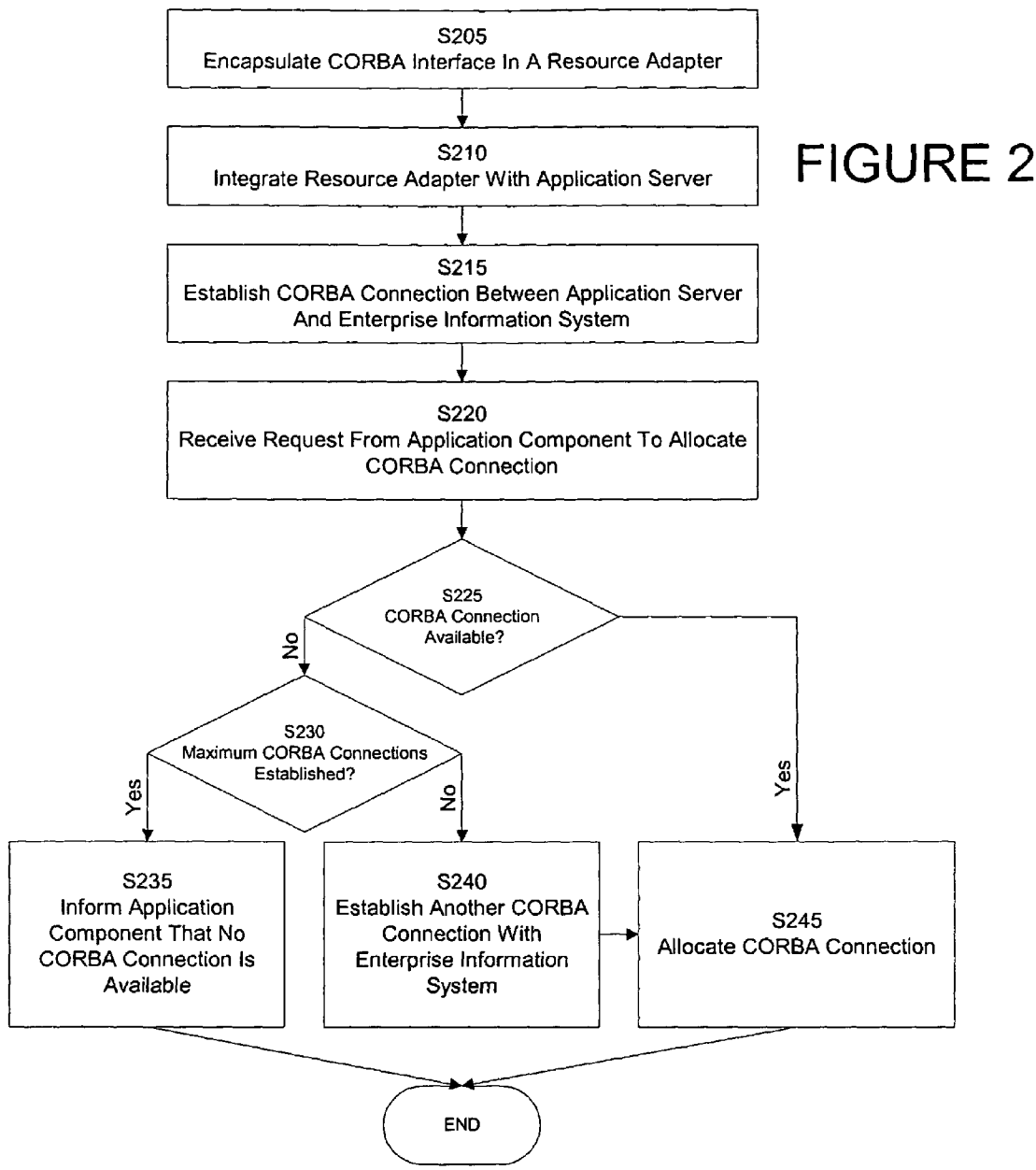
FIG. 2 is an exemplary flow diagram showing the management of CORBA connections from application components to an enterprise information system, according to an aspect of the present invention.

FIG. 2 is an exemplary flow diagram showing the management of CORBA connections from an application component 120 to a CORBA enterprise information system 190. At S205, the CORBA interface 180 is encapsulated in a resource adapter 150. The interface is defined in an interface definition language (IDL). The CORBA interface definition language is independent of programming languages used by, e.g., the application server 450 or the enterprise information system 480. However, the interface definition language maps to programming languages such as C, C++ and Java.

The encapsulated CORBA interface 180 may specify, for example, the application programming interfaces (APIs) that are used to process objects at the CORBA enterprise information system 190. The encapsulated CORBA interface 180 may also translate requests from the application component 120 to the appropriate CORBA application programming interfaces. For example, the encapsulated CORBA interface 180 may include a table of CORBA application programming interfaces and the corresponding commands from the application component 120 that are used to invoke each application programming interface. Because the resource adapter 150 is typically specific to the enterprise information system 190, the CORBA interface 180 is also typically specific to the enterprise information system 190. Accordingly, the CORBA interface 180 reflects the specific CORBA application programming interfaces used by the enterprise information system 190.

At S210, the resource adapter 150 is integrated with the application server program 100. For example, the relevant parameters of the deployment descriptor module 175 are set based on the various application components 120 implemented by the J2EE compliant application server that hosts the application server program 100. At S215, one or more CORBA connections 165 are established between the application server program 100 and the enterprise information system 190. In an embodiment, the management module 170 initially establishes the minimum number of managed CORBA connections 165 set by the deployment descriptor module 175. The managed CORBA connections 165 are added to the connection pool 115 of the application server program 100 and the connection manager 110 determines that the managed CORBA connection 165 is available.

At S220, a request is received via the application component 120 to allocate a CORBA connection 165 for the application component 120. At S225, a determination is made whether a CORBA connection 165 is available from the connection pool 115 of the application server program 100. The determination may be made by a connection manager 110 for the particular application component 120 making the request. If a managed CORBA connection 165 is available (S225=Yes), the managed CORBA connection 165 is allocated to the application component 120 at S245, and the process ends. In particular, the application-level handle of the physical CORBA connection 165 is passed to the application component 120. The application component 120 uses the returned connection handle to access the enterprise information system 190.

If a CORBA connection 165 is not available (S225=No), a determination is made at S230 whether a maximum number of CORBA connections 165 have been established between the application server program 100 and the enterprise information system 190. The determination at S230 may be based on whether a maximum number of CORBA connections 165 have been established for a particular application component 120, module or application, by the application server program 100. The determination is made with reference to parameters provided by the deployment descriptor module 170. If the maximum number of CORBA connections 165 have previously been established by the application server program 100 (S230=Yes), the application component 120 is informed that no CORBA connections 165 are available at S235, and the process ends. If the maximum number of CORBA connections 165 have not previously been established by the application server program 100 (S230=No), the management module 170 establishes another managed CORBA connection 165 at S240. The new managed CORBA connection 165 is then allocated to the application component at S245, and the process ends.

Accordingly, the connection manager 110 determines whether a CORBA connection 165 is available from the connection pool at S225. Additionally, when no CORBA connection 165 is available from the connection pool at S225 (S225=No), the management module 170 creates a new physical CORBA connection 165 to the enterprise information system 190 at S240, so long as the maximum number of CORBA connections 165 to the enterprise information system 190 have not already been established (S230=No).

Figure 3:
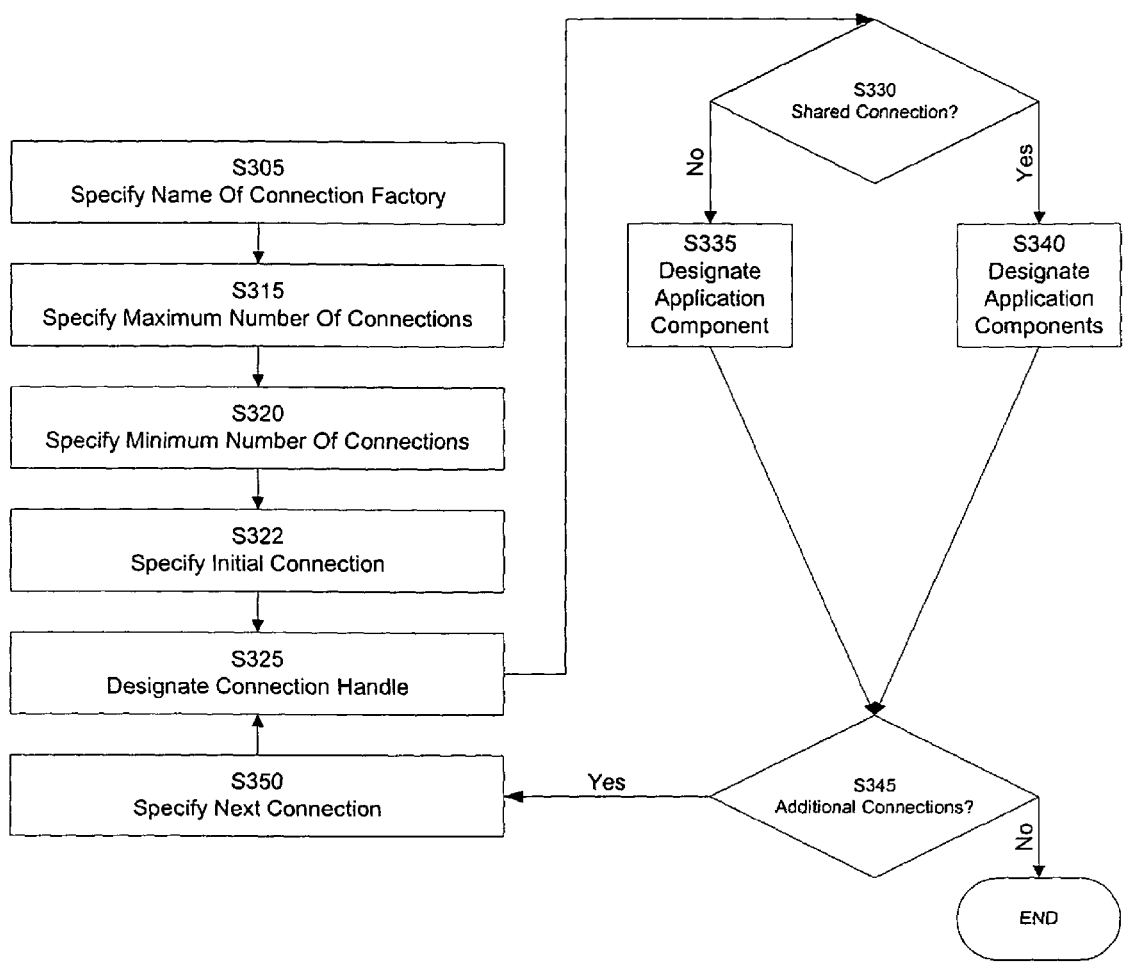
FIG. 3 is an exemplary flow diagram showing the customization of CORBA connections between an application server and an enterprise information system, according to an aspect of the present invention.

FIG. 3 shows the customization of connections 165 between an application server 450 and an enterprise information system 190. At S305, the name of the connection factory 155 is specified. Accordingly, the application component 120 will be able to obtain the name of the connection factory 155 in order to request a managed CORBA connection 165. At S315, the maximum number of connections 165 to be established for the application server program 100 is specified. The maximum number of connections 165 may be specified for each application component 120, application module, or application implemented by the application server program 100. At S320, the minimum number of connections 165 to be established for the application server program 100 is specified. The minimum number of connections 165 may be specified for each application component 120, application module, or application implemented by the application server program 100.

At S322, an initial managed CORBA connection 165 is specified. At S325, the physical connection handle of the initial managed CORBA connection 165 is designated. At S330, a determination is made whether the initial managed CORBA connection 165 is a shared managed CORBA connection 165. A shared managed CORBA connection 165 is shared by multiple application components 120, modules or applications implemented by the application server program 100.

If the initial CORBA connection 165 is not a shared managed CORBA connection 165 (S330=No), the application component 120, module or application that is eligible to use the initial managed CORBA connection 165 is designated at S335. If the initial CORBA connection 165 is a shared managed CORBA connection 165 (S330=Yes), the application components 120, modules or applications that are eligible to share the initial managed CORBA connection 165 are designated at S340.

At S345, a determination is made whether additional managed CORBA connections 165 are to be established. If an additional managed CORBA connection 165 is to be established (S345=Yes), the next managed CORBA connection 165 is specified at S350, the handle of the next managed CORBA connection 165 is designated at S325, and the process from S330 to S345 repeats. The process from S322 or S350 to S345 ends when no additional connections 165 are to be established (S345=No). Accordingly, the resource adapter 150 is customized by the minimum and maximum number of connections, by whether any particular managed CORBA connections 165 are to be shared, and by the application components 120, modules and applications that can use a particular managed CORBA connection 165.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. The steps of the embodiments shown in FIGS. 2 and 3 may be performed in a different order. For example, S320 may be performed before S315 in FIG. 3. Moreover, additional steps or fewer steps than shown may be performed within the scope of the present invention. For example, any process of customizing a J2EE—CORBA connector may be performed within the scope of the present invention. Additionally, the determinations made by the application server program 100 and the resource adapter 150 may be made by modules that are not specified herein, within the scope of the present invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for object request broker architectures (e.g., CORBA) and integration protocols for integrating application servers and enterprise information systems (e.g., J2EE) represent examples of the state of the art. Such standards are periodically superseded by faster or more efficient equivalents having essentially the same functions. Accordingly, replacement standards and protocols having the same functions are considered equivalents.

What is claimed is:

1. A method of managing connections between a Java 2 enterprise edition (J2EE) application server and a remote common object request broker architecture (CORBA) enterprise information system, comprising:
   integrating a resource adapter with the J2EE application server, the resource adapter comprising an encapsulated CORBA interface to the remote CORBA enterprise information system; and
   establishing a persistent CORBA connection between the J2EE application server and the remote CORBA enterprise information system.

2. The method of managing connections according to claim 1, further comprising:
   receiving a request from an application component implemented by the J2EE application server to allocate the persistent CORBA connection and determining whether the persistent CORBA connection is available for allocation.

3. The method of managing connections according to claim 2, further comprising:
   allocating the persistent CORBA connection to the application component when a persistent CORBA connection is available, and informing the application component that the CORBA connection is unavailable when the persistent CORBA connection is unavailable.

4. The method of managing connections according to claim 2, further comprising:
   establishing another persistent CORBA connection between the J2EE application server and the CORBA enterprise information system when the persistent CORBA connection is unavailable, and allocating the other persistent CORBA connection to the application component.

5. The method of managing connections according to claim 1, further comprising:
   receiving a message from the CORBA enterprise information system indicating that the persistent CORBA connection is not active and, in response, terminating the persistent CORBA connection.

6. The method of managing connections according to claim 1, further comprising:
   monitoring the persistent CORBA connection to determine whether the persistent CORBA connection is active.

7. The method of managing connections according to claim 1, further comprising:
   establishing additional CORBA connections between the J2EE application server and the CORBA enterprise information system until a predetermined minimum number of CORBA connections are established.

8. The method of managing connections according to claim 7, further comprising:
   establishing additional CORBA connections between the J2EE application server and the CORBA enterprise information system until a predetermined maximum number of CORBA connections are established,
   wherein a CORBA connection established after the predetermined minimum number of CORBA connections are established, is established based on a determination, in response to a request from an application component implemented by the J2EE application server to allocate a CORBA connection, that the previously established CORBA connections are unavailable.

9. A computer readable medium for storing a computer program that manages connections between a Java 2 enterprise edition (J2EE) application server and a remote common object request broker architecture (CORBA) enterprise information system, the computer readable medium comprising:
   an integrating code segment that integrates a resource adapter with the J2EE application server, the resource adapter comprising an encapsulated CORBA interface to the remote CORBA enterprise information system, and
   a persistent CORBA connection establishing code segment that establishes a persistent CORBA connection between the J2EE application server and the remote CORBA enterprise information system.

10. The computer readable medium according to claim 9, further comprising:
    a request receiving code segment that receives a request from an application component implemented by the J2EE application server to allocate the persistent CORBA connection; and
    an availability determining code segment that determines whether the persistent CORBA connection is available for allocation.

11. The computer readable medium according to claim 10, further comprising:
    a CORBA connection allocating code segment that allocates the persistent CORBA connection to the application component when a persistent CORBA connection is available; and
    a connection manager informing code segment that informs the application component that the CORBA connection is unavailable when the persistent CORBA connection is unavailable.

12. The computer readable medium according to claim 10, further comprising:
    another persistent CORBA connection establishing code segment that establishes another persistent CORBA connection between the J2EE application server and the CORBA enterprise information system when the persistent CORBA connection is unavailable; and another CORBA connection allocating code segment that allocates the other persistent CORBA connection to the application component.

13. The computer readable medium according to claim 9, further comprising:
a message receiving code segment that receives a message from the CORBA enterprise information system indicating that the persistent CORBA connection is not active; and
a persistent CORBA connection terminating code segment that terminates the persistent CORBA connection in response to receiving the message that the persistent CORBA connection is not active.

14. The computer readable medium according to claim 9, further comprising:
a monitoring code segment that monitors the persistent CORBA connection to determine whether the persistent CORBA connection is active.

15. The computer readable medium according to claim 9, further comprising:
a minimum CORBA connections establishing code segment that establishes additional CORBA connections between the J2EE application server and the CORBA enterprise information system until a predetermined minimum number of CORBA connections are established.

16. The computer readable medium according to claim 15, further comprising:
a maximum CORBA connections establishing code segment that establishes additional CORBA connections between the J2EE application server and the CORBA enterprise information system until a predetermined maximum number of CORBA connections are established,
wherein a CORBA connection established after the predetermined minimum number of CORBA connections are established, is established based on a determination, in response to a request from an application component implemented by the J2EE application server to allocate a CORBA connection, that the previously established CORBA connections are unavailable.

17. A Java 2 enterprise edition (J2EE) compliant application server that hosts a resource adapter for managing connections between the J2EE application server and a remote common object request broker architecture (CORBA) enterprise information system, comprising:
a processor that implements a customized deployment descriptor for deploying the resource adapter, the resource adapter comprising an encapsulated CORBA interface for the remote CORBA enterprise information system, the deployed resource adapter establishing a persistent CORBA connection between the J2EE application server and the remote CORBA enterprise information system.

18. The J2EE application server according to claim 17, further comprising:
a connection manager that processes a request received from an application component implemented by the J2EE application server to allocate the persistent CORBA connection, the J2EE application server determining whether the persistent CORBA connection is available for allocation in response to receiving the request.

19. The J2EE application server according to claim 18, in which the connection manager further allocates the persistent CORBA connection to the application component when the persistent CORBA connection is available, the connection manager determining that the CORBA connection is unavailable when the persistent CORBA connection is unavailable.

20. The J2EE application server according to claim 18, in which another persistent CORBA connection is established with the CORBA enterprise information system when the persistent CORBA connection is unavailable, and in which the connection manager further allocates the other persistent CORBA connection to the application component.

21. The J2EE application server according to claim 17, further comprising:
a connection manager that receives a message from the CORBA enterprise information system indicating that the persistent CORBA connection is not active, the connection manager terminating the persistent CORBA connection in response to receiving the message.

22. The J2EE application server according to claim 17, further comprising:
a connection manager that monitors the persistent CORBA connection to determine whether the persistent CORBA connection is active.

23. The J2EE application server according to claim 17, further comprising:
a management module that establishes additional CORBA connections with the CORBA enterprise information system until a predetermined minimum number of CORBA connections are established.

24. The J2EE application server according to claim 23, the management module establishing additional CORBA connections with the CORBA enterprise information system until a predetermined maximum number of CORBA connections are established.

25. The J2EE application server according to claim 24, further comprising:
a connection manager that receives requests from an application component implemented by the J2EE application server to allocate a CORBA connection, the management module establishing CORBA connections after the predetermined minimum number of CORBA connections are established, based on a determination that the previously established CORBA connections are unavailable.

* * * * *